Nov. 17, 1970  G. S. RUBY  3,541,308
AUTOMATED PARKING FACILITY
Filed March 28, 1968  5 Sheets-Sheet 1

INVENTOR
GEORGE S. RUBY
BY
*J. Tauxin Jr.*
ATTORNEY

Nov. 17, 1970  G. S. RUBY  3,541,308

AUTOMATED PARKING FACILITY

Filed March 28, 1968  5 Sheets-Sheet 5

United States Patent Office 3,541,308
Patented Nov. 17, 1970

3,541,308
AUTOMATED PARKING FACILITY
George S. Ruby, Scarsdale, N.Y., assignor to International Business Machines Corporation, Armonk, N.Y., a corporation of New York
Filed Mar. 28, 1968, Ser. No. 716,794
Int. Cl. G06k 17/00
U.S. Cl. 235—61.6                5 Claims

ABSTRACT OF THE DISCLOSURE

An automated parking garage system using prepunched tickets which are read by a computer on entry of an auto into the facility. The computer stores the time of entry of the particular ticket so that the fee can be computer calculated later when the ticket is presented at the exit point. The computer also controls lane and level status signs which direct autos to available parking areas.

FIELD OF THE INVENTION

This invention relates to a method and apparatus for monitoring and controlling vehicular movement within a parking facility, for automatically calculating parking fees, and auditing cash receipts.

DESCRIPTION OF THE PRIOR ART

In major cities having large populations, the need for providing off-street parking in order to reduce traffic congestion is apparent. The facilities may be provided by private concerns or public agencies and in either event the problems of administering the cash receipts accounting and the flow of cars within the parking facilities are similar.

Payment for the use of the parking facility may be by cash, validation ticket, or credit card. A parking attendant is responsible for collecting the cash, the validation ticket, or recording the credit transaction. Often, the result of these manual operations in cash accounting result in a paucity of information, poor security of cash, and inability to cope with the massive accounting problem generated by the tickets. It is generally recognized that in excess of 20 percent loss in revenue is normal in parking facilities due to human errors, unintentional or otherwise.

The flow of traffic within the facility itself has been traditionally handled in one of two ways: either a parking attendant is responsible for driving the vehicle from the entry station to a parking stall, or else the driver of the vehicle himself locates a stall and parks therein. Electromechanical systems have been developed for directing vehicles to vacant areas in the facility. However, these traffic flow systems do not provide the data required to analyze the operation of the facility for optimization of facility use. Also, in the prior art, any system developed for control of vehicular flow within the facility was entirely separate and distinct from that system developed for cash control. Additionally, a single system for running cash balances, revenue control, inventory and audit control, and computation of charges was not available. Nor has a single such system been available for simultaneously controlling a plurality of parking facilities.

As a result of the manual computation of parking fees and the reporting, daily records are not available or are unduly delayed.

Accumulation, turnover, and parking statistics are not available from the existing systems for traffic flow control.

SUMMARY OF THE INVENTION

It is, therefore, an object of the invention to provide a system for inventory and cash control of a parking facility or plurality of parking facilities.

It is a further object of the invention to provide machine computation of parking fees thereby eliminating the need for human calculation.

It is a further object of the invention to speed the exit operation and decrease the delay at exit in parking facility.

It is a further object of the invention to provide current daily, weekly, monthly, etc. records and reports for management control of fiscal operations.

It is a further object of the invention to provide timely accumulation, turnover, and parking statistics for analysis of facility operations.

It is a further object of the invention to maximize floor usage through zonal or level inventory control.

It is a further object of the invention to provide to and for each cashier a record of transactions and cash collected.

It is a further object of the invention to provide data on lane demands for both entry and exit stations.

It is a further object of the invention to provide a system for paying the parking fee which is readily adaptable to cash, or tokens, validation ticket, or credit card payment.

It is a further object of the invention to provide a single cash and inventory control system for a plurality of parking facilities.

The invention, therefore, provides a system using prepunched tickets which are read by the computer on entry of a vehicle into the parking facility. The computer stores the time of entry of the particular ticket (and therefore, of the vehicle) so that the fee can be calculated later when this ticket is presented at the exit point. In the system the only information which the computer need read from the ticket is the prepunched number. The time can be stamped on the ticket for the benefit of the driver; however, the computer does not obtain this information from the ticket.

The system of the invention is adaptable for accounting of the cash collected by each cashier by providing each cashier with an identification card to activate the system. Similarly, the system of the invention may be adapted for traffic control using bidirectional counters to keep track of the cars in each area, and through use of computer controlled signs direct drivers to vacant areas.

The foregoing and other objects, features and advantages of the invention will be apparent from the following more particular description of a preferred embodiment of the invention, as illustrated in the accompanying drawings.

DESCRIPTION

Figure 1:
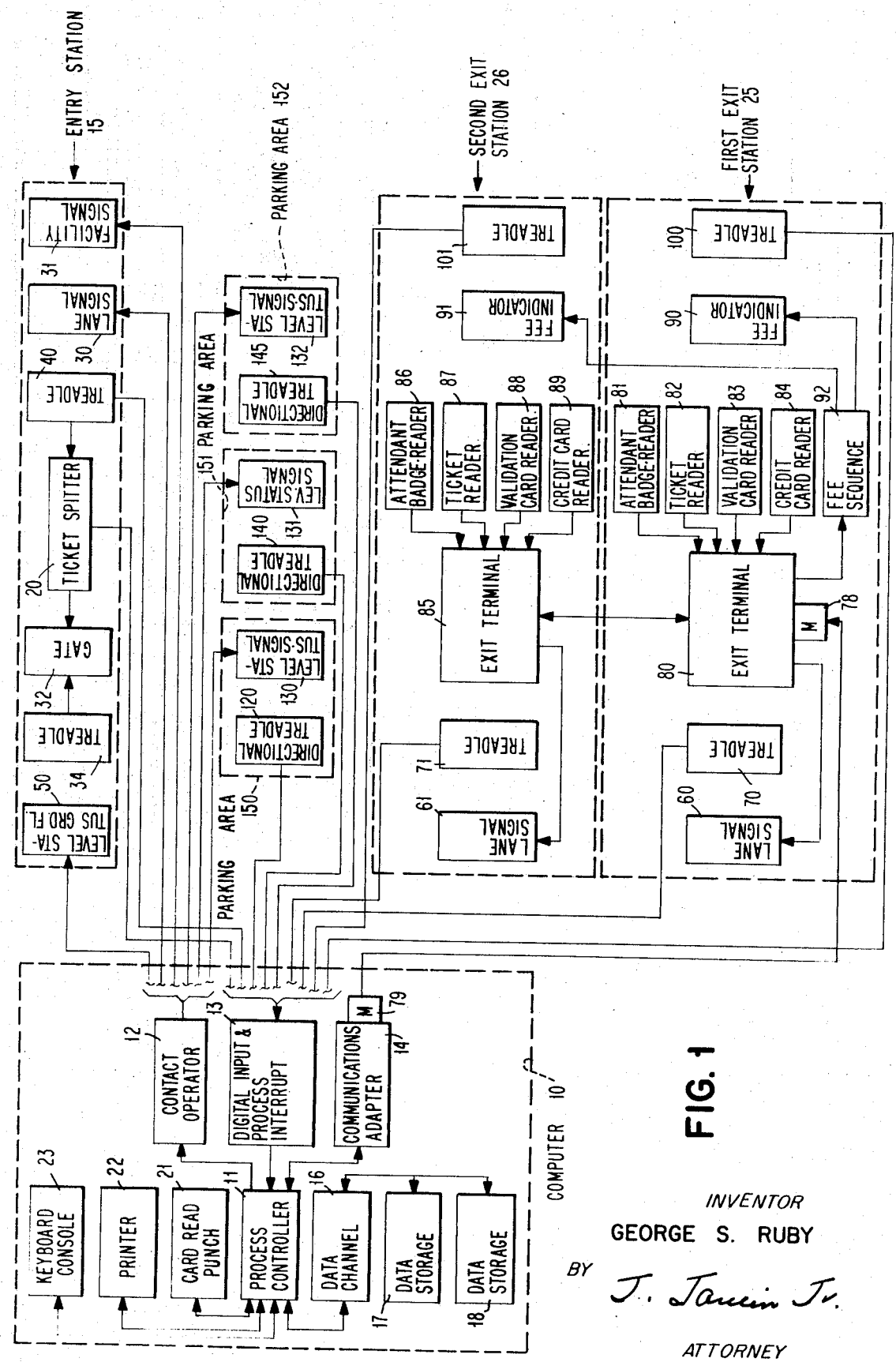
FIG. 1 is a system diagram of a preferred embodiment of the parking facility cash and inventory control system of the invention.
Figure 2:
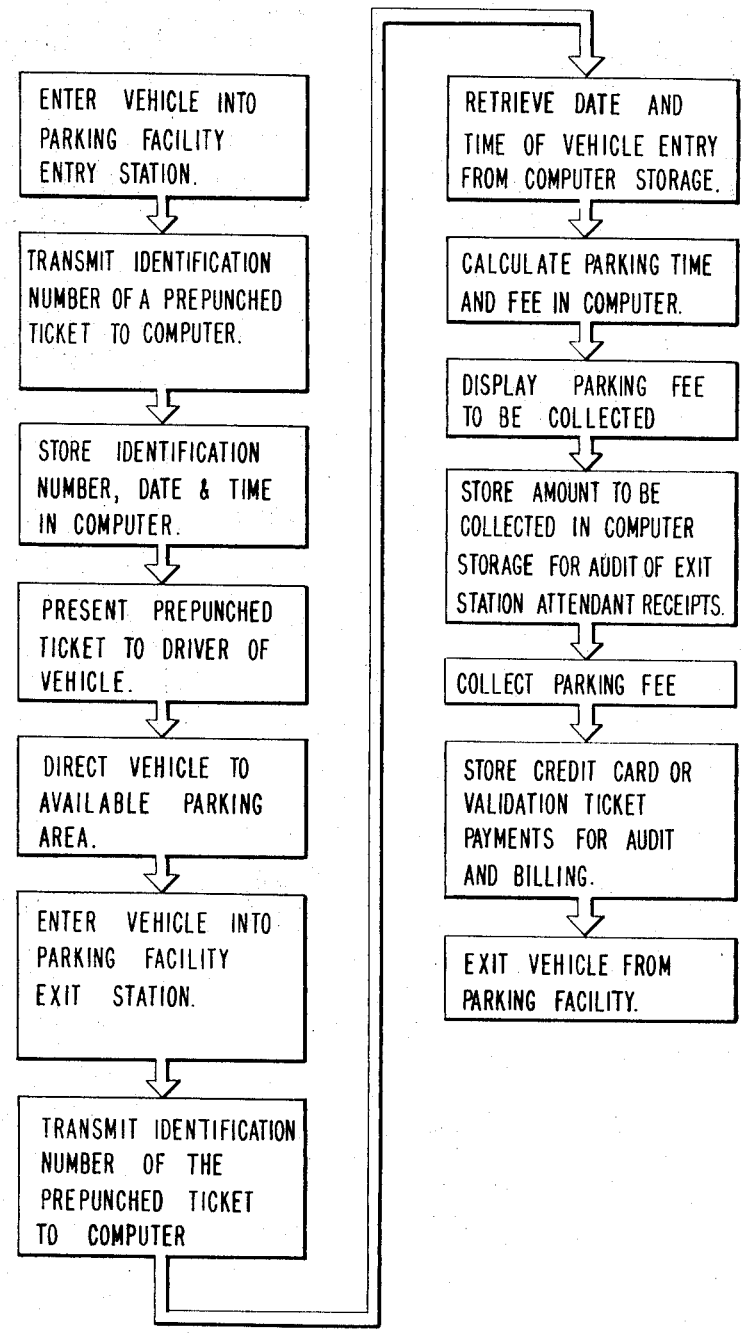
FIG. 2 is a flow diagram of a preferred embodiment of the method of the invention for controlling an automated parking facility.

Referring now to the drawings, a detailed description of a preferred embodiment of the system of the invention for monitoring and controlling the vehicular movement within a parking facility and for automatically calculating parking fees and auditing receipts will be described.

Referring to FIG. 1 the central computing facility 10 will first be described. Computer 10 comprises a process controller or CPU 11. Card/read punch 21, printer 22, and keyboard console 23 are provided for the input of data by the systems operator and the output of information. Also attached to process controller 11 through data channel 16 are data storage devices 17 and 18. An example of a commercially available process controller 11 suitable for the purposes of this invention is the IBM System 1801 Model 2C Process Controller having a Model 322 Data Channel, a 3262 Digital Input Adapter, a Model 3291 Digital Input Channel Adapter, 3285 Digital Input Contact, a Model 5710 Process Interrupt Adapter, a Model 5715 Process Interrupt Contact, a Model 3295 Digital Output Adapter, a Model 3296 Digital Output Control, a Model 3612 Electrical Contact Operator, a Model 3290 Digital Output Channel Adapter, a Model 3430 1442 Adapter, a Model 4431 1443 Adapter, and a Model 4432 1443 Control. As an example of keyboard control 23, the IBM 1816 Console may be used. An example of printer 22 is the IBM 1443 Printer. For card/read punch 21, the IBM 1442 Card Read Punch may be used. For data storage devices 17 and 18, the IBM 2310 may be used.

For the purpose of this description, contact operator 12 is shown separated from process controller 11; however, contact operator 12 is included within the IBM 1801 as the 3612 Electrical Contact Operator noted above. While for the purpose of this discussion digital input and process interrupt contacts 12 are shown separate from process controller 11, said contacts 13 may comprise the Digital Input Contact Molel 3285 and Process Interrupt Contact Model 5715, also noted above. For the purposes of this embodiment data channel 16 comprises IBM Model 3212 Data Channel, noted above.

While computer 10 as described above comprises an IBM System 1800, it is understood, for instance, that the IBM System/360 having communications adapters Models 2701, 2702, and 2703 may also be used. Similarly, IBM System 1130 may also be used provided it contains the communications adapter feature. Also, computer 10 may comprise any time sharing or process control system containing the appropriate communications adapter needed to send and receive electrical signal over telephone lines between facilities.

Referring further to FIG. 1, computer 10 also comprises contact operator 12 digital input and process interrupt contacts 13, and communications adapter 14 with modulator/demodulator 79. Contact operator 12 controls, for example, the operation of facility signals 31, lane signal 30, ground floor level status 50, level status signal 130, 131, and 132.

Digital input and process interrupt contacts 13 are driven by the various treadles (i.e., vehicle sensing device) and directional treadles located throughout the facility and in turn interrupts process controller 11 to signal the entry or exit of a vehicle from a given lane or area.

Communications adapter 14 is the communications link between the process controller 11 and exit terminal 80. Located at each end of the telephone line interconnecting communications adapter 14 and exit terminal 80 are modulator/demodulators 78 and 79, such as commercially available telephone data sets.

Referring further to FIG. 1, a systems diagram of a typical entry station 15 will next be described. It is to be understood that a plurality of such entry stations, one for each entrance lane into a parking facility, is similarly constructed. A plurality of entrance lanes to each of a plurality of facilities is controlled by system 10. Facility signal 31, indicating to the public whether or not parking is available within the facility, is controlled by process controller 11 through contact operator 12. Similarly, lane signals 30 and ground floor level status signal 50 are controlled by process controller 11 through contact operator 12. Treadle 40, is located within the lane so that a vehicle entering the facility through the particular entrance being described will be detected and a signal sent to the process controller through the digital input 13, and a signal sent to ticket spitter 20. It is to be understood that treadle 40 may be an electro-mechanical contact responsive to the weight of a vehicle as it passes over said contact, a photoelectric device, or any other device known to the art capable of sensing the entrance of a vehicle and transmitting an electrical pulse to ticket spitter 20 and digital input 13. Ticket spitter 20 comprises a transport mechanism for presenting a prepunched ticket to the operator of the vehicle; and a card reader for sensing the identification number on said ticket and transmitting it to the process controller 11 through digital input 13; and, optionally, control means for opening a gate 32 to allow passage of the vehicle into the parking facility. In the event gate 32 is used, treadle 34 senses the passage of the vehicle from the entry station 15 and signals gate 32 to close. Gate 32 may comprise any well-known apparatus for selectively blocking the passage of a vehicle through a traffic lane.

Referring further to FIG. 1, parking areas 150, 151, and 152 will next be described. Associated with each parking area, for example parking area 150, are directional treadles 120 for sensing the passage of a vehicle into or out of the parking area. Parking area 150 is meant to include a floor of a multilayer parking facility, or a given area of a lot, etc. A plurality of parking areas may be so controlled, and the invention is not limited to the three shown in FIG. 1. Also, within each parking area, are level status signals for example, 130. Directional treadles are a pair of treadles or a pair of photoelectric cells. By associating the two cells or the two treadles as one directional pair, direction can be ascertained through programming when the individual presence detector status is read at sufficiently small intervals by process controller 11 through digital input 13. Level status signal 130 indicating to the drive of the vehicle if parking is available within the level of interest or not, is controlled by process controller 11 through contact operator 12.

Referring further to FIG. 1, the first exit station 25 will next be described. Attendant badge reader 81 is activated by the parking attendant inserting an identification badge. The insertion of the identification badge signals exit terminal 80. Upon insertion of the attendant's badge into badge reader 81, exit terminal 80 turns lane signal 60 to "open" and signals process controller 11 through communications adapter 14 that the first exit station 25 is open for the exit of vehicles from the facility, and identifies the attendant. Process controller 11 then sets up a location in data storage 17 and 18 for posting the cash receipts to be charged to said attendant as will be described in greater detail hereafter. As a vehicle to exit from the facility enters first exit station 25 it trips treadle 70 thereby signaling the process controller 11 through process interrupt contact 13 that the transaction is about to occur in first exit station 25. The parking attendant inserts the prepunched ticket obtained from the operator of the vehicle into ticket reader 82. The punched information in said ticket is read by ticket reader 82 and transmitted to the process controller 11 through communications adapter 14 and exit terminal 80. The parking fee, calculated within process controller 11 is transmitted to fee indicator 90 through fee sequencer 92, exit terminal 80, and communications adapter 14. If payment is by validation card, the amount of the parking fee to be offset by the validation card is read by validation card reader 83 and transmitted to process controller 11 through communications adapter 14 and exit terminal 80 for storage in data storage 17 or 18 in the storage area reserved for accumulating charges against an identified merchant. If payment is to be by credit card, the credit card is read in credit card reader 84 and similarly transmitted to process controller 11 for storage in data storage 17 or 18 in the area reserved for accumulating charges to the customer.

For the purpose of this description of the preferred embodiment of first exit station 25, IBM 1031–A7 combines the logic functions described for exit terminal 80, attendant badge reader 81, and validation card reader 83. An IBM 1034 may be used for ticket reader 82 and similarly, and IBM machine No. 1035 may be used for credit card reader 84. Fee sequencer 92, fee indicator 90, treadle 70, lane signal 60, and treadle 100 are commercially available parts, well known by those skilled in the art for performing the functions described.

Treadle 100 signals to process controller 11 through process interrupt contact 13 when a vehicle leaves exit station 25. If all of the transactions and events which are to occur in exit station 25 before the vehicle is to exit have not occurred an alarm (not shown) is sounded and a print-out provided on printer 22.

Referring again to FIG. 1, second exit station 26 will next be described. It is to be understood that subsequent (i.e., third, fourth, fifth, etc.) exit stations similar to station 26 may be provided and the description which follows for exit station 26 is applicable to the other "subsequent" stations. Also, a number of first exit stations 25, located in different parking facilities, may be controlled by computer 10.

Attendant badge reader 86 controls lane signal 81 through exit terminal 85, and signals to process controller 11 through communications adapter 14, exit terminal 80 and exit terminal 85 that second exit station 26 is open for the exit of vehicles from the parking facility. Treadle 71 signals to process controller 11 through process interrupt contact 13 when a vehicle enters second exit station 26. Ticket reader 87 reads the identification number on the prepunched ticket presented to the parking exit attendant by the operator of the vehicle and signals said information through exit terminal 85, exit terminal 80, and communications adapter 14 to process controller 11. The parking fee to be collected is signaled to fee indicator 91 through fee sequencer 92, exit terminal 80, and communications adapter 14 from process controller 11. The amount of the parking fee to be charged to a validating merchant or to a customer credit account is signaled to the process controller 11 through exit terminal 85 and 80 and communications adapter 14 from validation card reader 88 or credit card reader 89 as the case may be. Treadle 101 signals to the process controller 11 through process interrupt contact 13 when a vehicle exits from said second exit station 26.

Note that the second exit station 26 and the first exit station 25 differ in the following respects. Fee sequencer 92 drives the fee indicator 90 and 91 for both exit stations 25 and 26. Exit terminal 80 communicates with communications adapter 14 for both first exit station 25 and second exit station 26, and exit terminal 85 communicates through exit terminal 80 to computer 10.

For the purpose of the description of this preferred embodiment, the lane signal 61, treadle 71, fee indicator 91 and treadle 101 perform functions familiar to those skilled in the art and are generally commercially available. Exit terminal 85, validation card reader 88 and attendant badge reader 86 have their functions combined in IBM 1031–B7. An IBM Card Reader 1035 may be used for ticket reader 87 and similarly an IBM Card Reader 1035 may be used for credit card reader 89.

Just as the amount of the parking fee to be paid by validation card or a credit card may be signaled to the process controller 11, similarly, the cash amount collected could be read in an automatic coin counter (not shown). In this embodiment, the attendant is not needed at the exit station, and the operator of the vehicle inserts his ticket directly into ticket reader 82, for example. A gate, (not shown) is provided at the exit of the exit station. Process controller 11 through contact operator 12 opens said gate (not shown) once the complete parking fee has been collected by cash, validation card, or credit card.

OPERATION

The operation of the system of the invention for monitoring and controlling vehicular movement within a parking facility and for automatically calculating parking fees will next be described.

Figure 3:
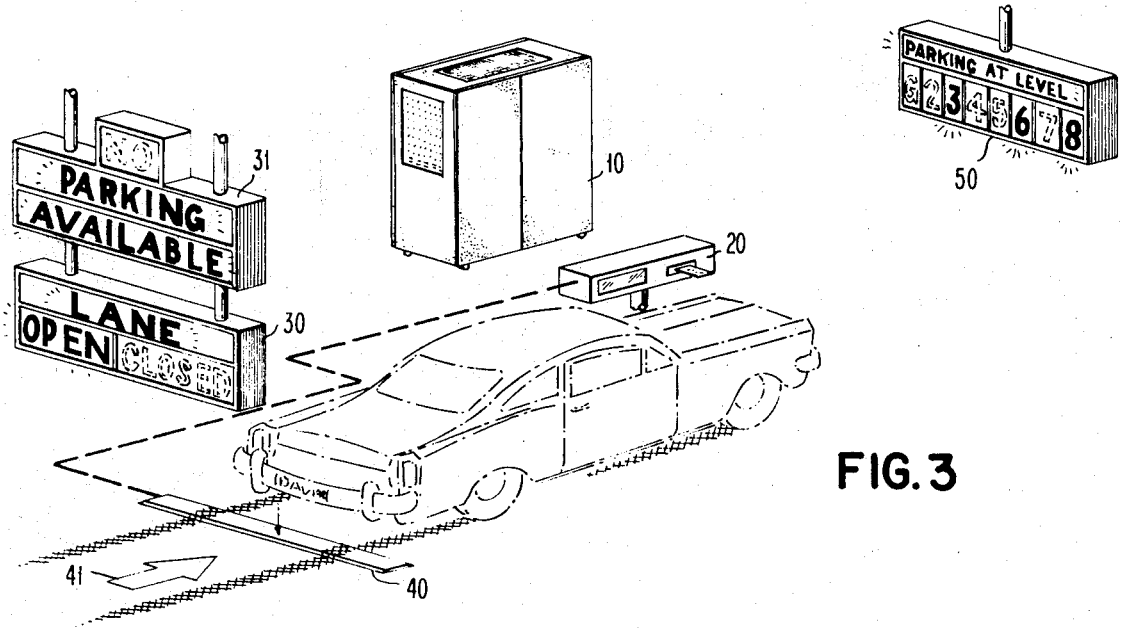
FIG. 3 is a diagrammatic view of an entry station to a parking facility.

Referring to FIG. 3, as a vehicle enters a facility in the direction of arrows 41, treadle 40 detects its presence and causes two events to occur: First, the transport mechanism of ticket spitter 20 is activated; and, second, a process interrupt is sent to the computing system 10, for updating the population count (viz the number of vehicles parked or circulating the facility) and activating the sign and traffic control. The transport mechanism of the ticket spitter 20 carries a prepunched ticket passed a time stamp mechanism (for stamping the date and time) and passed a card reading mechanism, both contained within said ticket spitter 20 (and not otherwise shown). The process interrupt signal also causes the computing system 10 to read the digits coming from the card reader in ticket spitter 20. When the complete ticket number is in the computer 10, this number, along with the date and time, is written on one of the magnetic disk attached to or is otherwise stored in the computer.

As the prepunched ticket is removed from ticket spitter 20 by the operator of the vehicle, a pulse is sent from the ticket spitter 20 to the computer 10 to update the ticket number control counter in said computer 10. Another pulse that is also sent is the tens synchronizer. Prepunched on any ticket ending with the digit zero is a tens synchronizer hole in a unique field. A contact is closed when this hole is sensed by the card reading mechanism of ticket spitter 20, and computer 10 checks the ticket number control counter to check the validity of the number. If the tens synchronizer pulse and the control counter are not in phase, the ticket number control counter steps up to the next serial number ending with zero, and the computer 10 will print out a message on the console. The control counter number is then stored in computer 10 with date and time.

The computer 10 also checks to see if there is still an ample supply of prepunched tickets in ticket spitter 20. This is done by recording in computer 10 the ending number of the batch of prepunched tickets put into ticket spitter 20 and checking for this number as the prepunched tickets are issued to the drivers of entering vehicles. If the ticket supply is exhausted the entry lane is closed by computer 10 and the system operator alerted.

Figure 4:
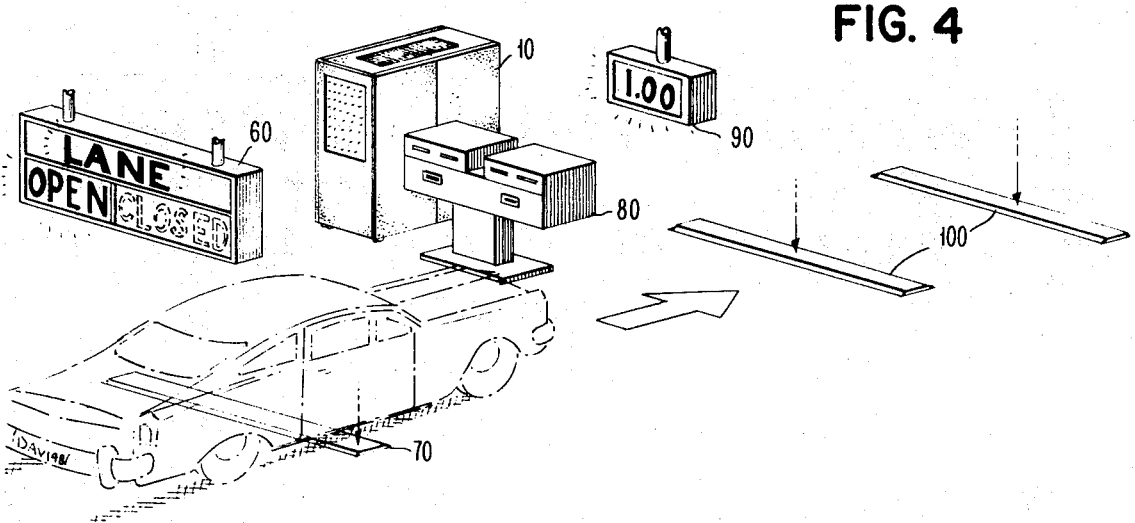
FIG. 4 is a diagrammatic view of a typical parking facility vehicle exit station for use in the invention.

Referring now to FIG. 4, when a vehicle leaves the parking facility, a fixed sequence of events occurs. If these events do not occur in the proper sequence, an operator is alerted. The motorist walks to his vehicle and drives to an exit lane. As the vehicle approaches a cashier station 80, its presence is indicated to the computing system 10 by treadle 70. Next, the attendant inserts the customer's punched parking ticket into a reader 82, and the number which was originally prepunched in the card is read into system 10. When the complete number is in the computer 10, the corresponding record (this record has identification number, time and date) which was stored in data storage 17 when the vehicle entered the facility is obtained. The computer 10 then subtracts the stored time and date from the current time and date to come up with the elapsed time (time in the facility). The elapsed time is multiplied by the rate established by the parking authority, and the amount due determined. Digital display 90 which is visible to both customer and attendant at the exit point is then activated by the computer 10 to tell the customer and the attendant what fee must be collected. The cashier collects the amount owed and the vehicle then leaves the facility by passing over detector 100 (located just after the cashier station 80) which signals completion of the transaction to computer 10. If this sequence of events does not occur, a message is displayed on the console printer.

If a customer loses his ticket, the cashier will inert a stub in the reader 80 which will cause a pre-established lost ticket rate to be charged. In this case, the ticket initially issued to the customer is not accounted for; hence, all active status storage records which are older than the specified maximum are eliminated from the system daily.

When an employee takes responsibility for a cashier station 80, his first task is to sign into the system 10 by inserting his employee identification card into the reader 81. This trips a print out in computer 10 of the cash amount the previous attendant should have in his cash drawer; and also causes computer 10 to set up an attendant area in storage for recording cash recepits and recording time on the job. If the previous employee has not signed out the console operator is notified by the computer 10. After an employee signs in, all subsequent transactions at this station are charged to him. That is, as an amount due is transmitted to fee indicator 90, counter in computer 10 is updated to the amount the attendant should have in his cash drawer. When he signs out, either he or another employee must sign back in before further transactions are conducted. After an employee has signed out, his collected cash is placed in a container and submitted to his supervisor for counting. This amount is compared with the system computer value, and the two should agree.

To allow management officials to be advised of the monetary and vehicle utilization status of the system, timely summary reports are provided. The system may be programmed to provide regular and/or on demand management reports; such as, (1) vehicle accumulation by floor in each facility, (2) vehicle total by facility and entry and exit lanes, (3) cash collected by cashier, by exit, or facility, (4) identification of the attendant at a particular station and his cash on hand, and (5) input treadle count versus number of vehicles submitting to exit routine.

Figure 8:
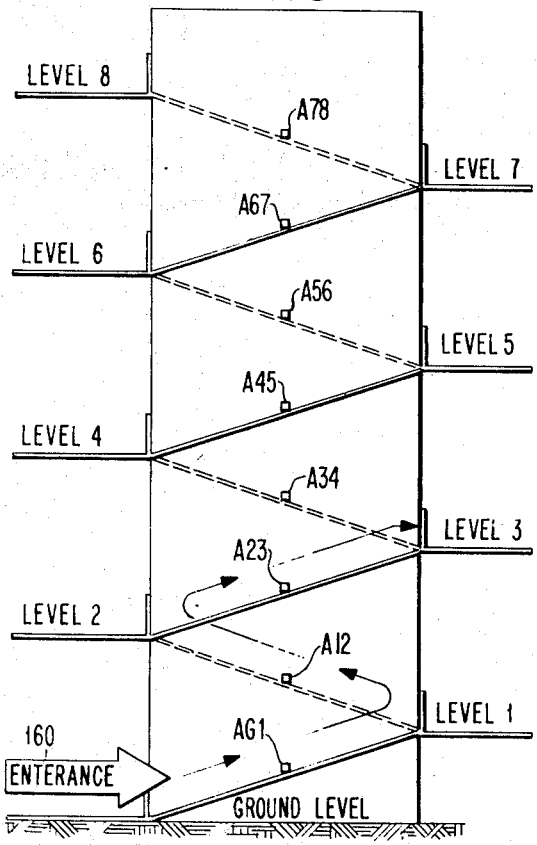
FIG. 8 shows in diagrammatic view the entries from an ascending ramp to even and odd levels.

Referring now to FIGS. 5–9, the system also controls traffic within the parking facility or garage. As an example of the operation of the system for controlling the flow of traffic, assume that a vehicle is leaving the entry station 15, and that parking is available on the third level. Referring to FIG. 3 the ground floor level status sign 50 will indicate parking available on the third level. Referring to FIG. 8, as the vehicle enters the ascending ramp, directional control AG1 will signal to the computer that a vehicle has left the ground floor and entered the first level. As the vehicle continues passed directional control A12 said control will signal to the computer that a vehicle has left level 1 and entered level 2. As the vehicle continues passed control A23, said control will signal to the computer that a vehicle has left the second level and entered the third level. Thus, when a vehicle passes a detector, it is counted by the computer out of the area or level it is leaving and into the area or level it is entering.

Figure 10:
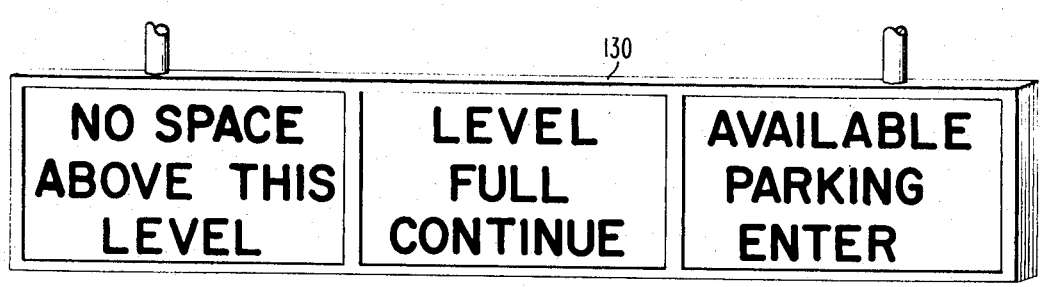
FIG. 10 shows a typical level status sign for floors other than the ground floor.
Figure 5:
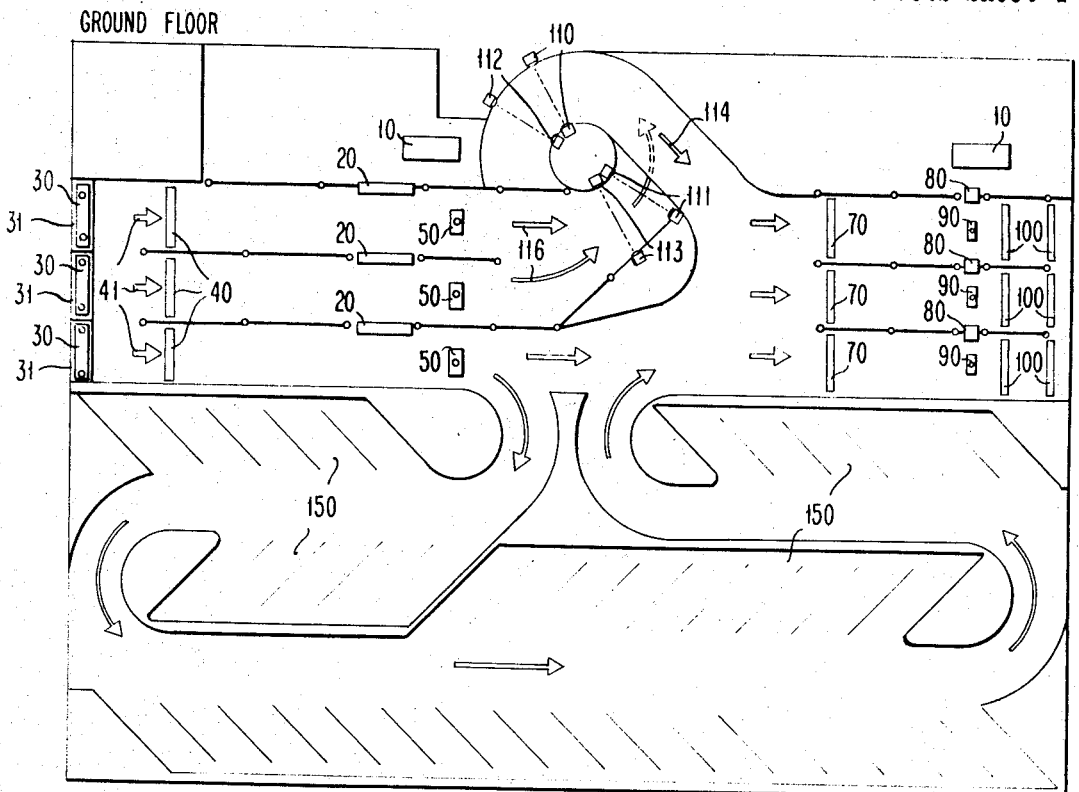
FIG. 5 is a diagrammatic view of the ground floor of a typical parking facility, showing the vehicular flow and control system.
Figure 6:
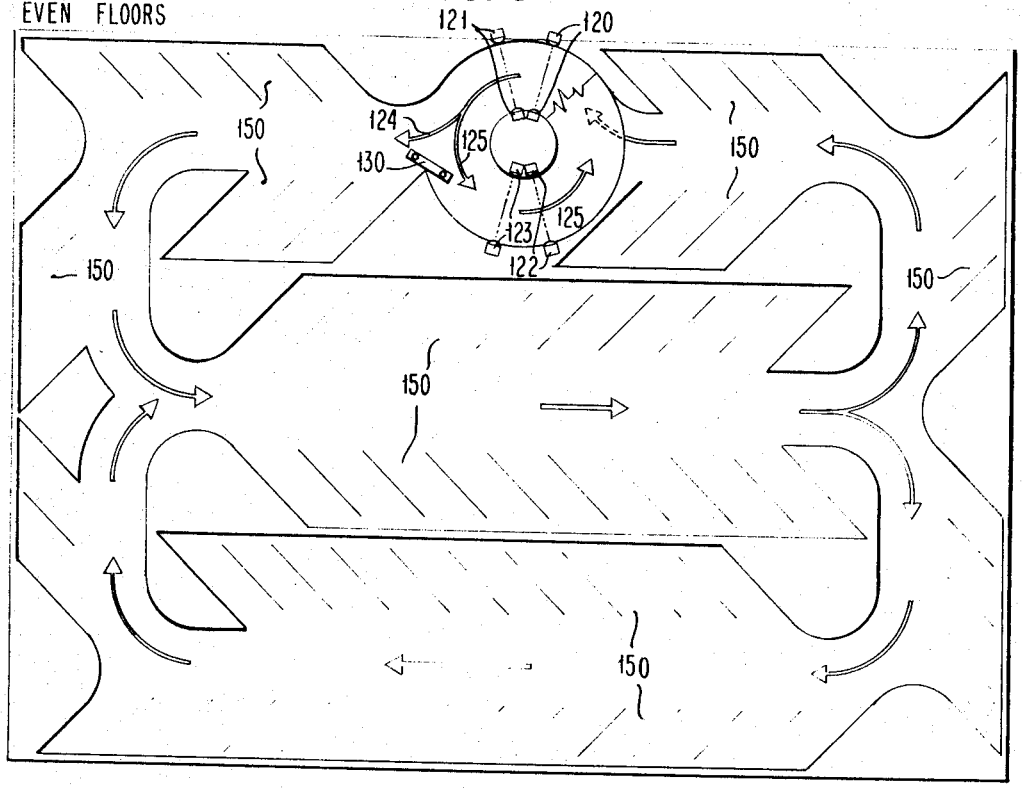
FIG. 6 is a diagrammatic view showing the vehicular control system for the even numbered floors of a typical parking facility.
Figure 7:
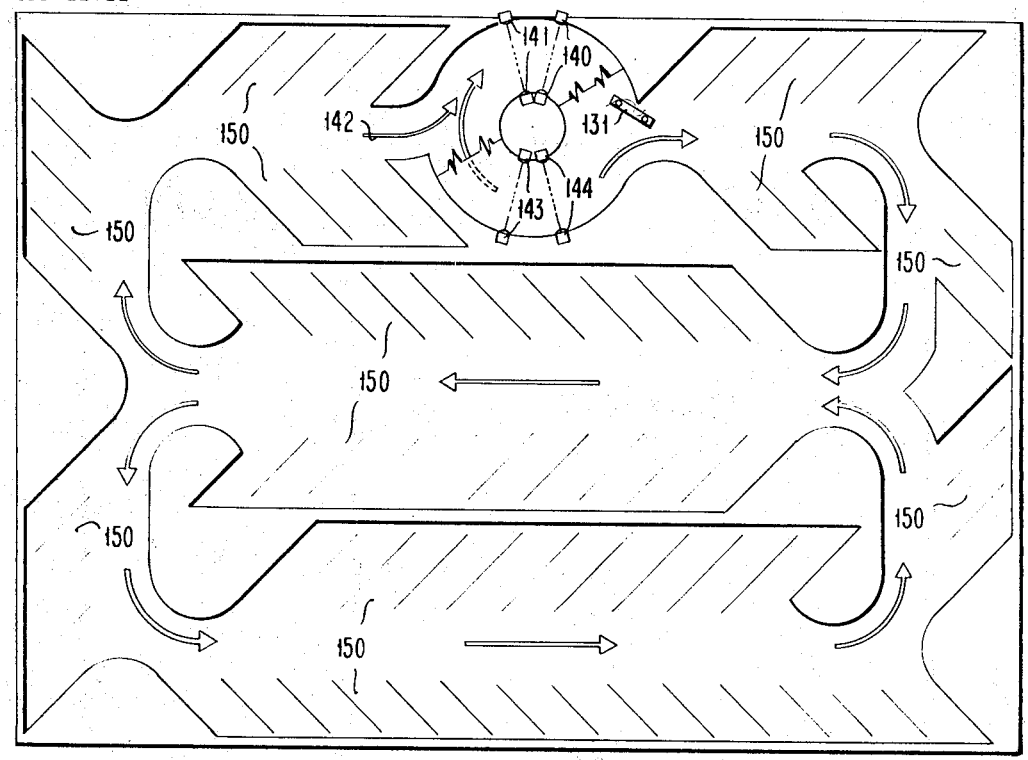
FIG. 7 is a diagrammatic view showing the vehicular flow control system for the odd floors of a typical vehicular parking facility.

Referring to FIGS. 1 and 10, the level status signs are controlled by the facility counter of the process controller 11 through contact operator 12. Assuming that as the vehicle enters level 3 that the incremented computer count indicates that said level is full. The ground level sign 50 will change to indicate that parking is not available on level 3, and the status sign of FIG. 10 located at the entrance to level 3 will be changed to indicate that level 3 is full, and that the vehicle is to continue to a higher level; thus, when the count indicates that one of the areas is full, the appropriate signs will be turned on to inform drivers of the condition, and to direct them to different levels or facilities.

Figure 9:
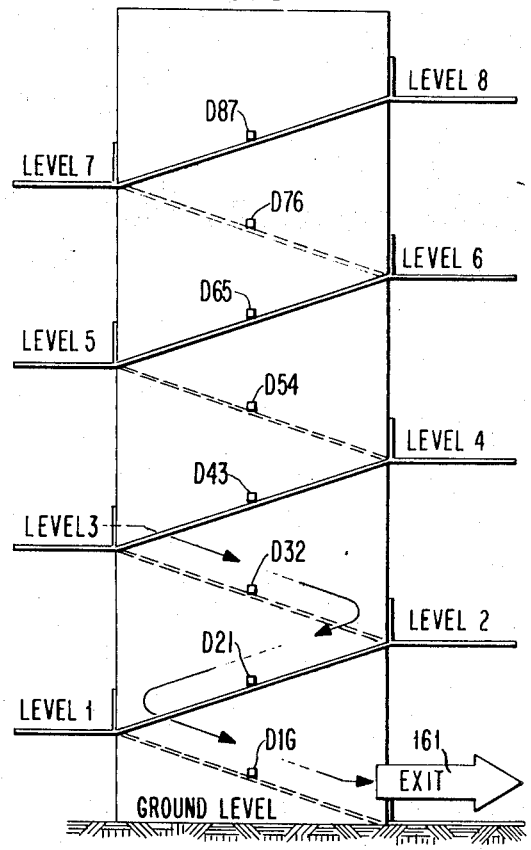
FIG. 9 shows in diagrammatic view the exits from odd and even levels to a descending ramp.

Similarly, referring to FIG. 9, as the vehicle leaves level 3 in the direction of arrow 161, and descends to the ground level, it will be counted out of the third level as it passes counter D32 and into the second level. As it passes counter D21 the vehicle will be counted out of the second level and into the first level. As the vehicle passes counter D1G, the computer 10 will be signaled that the vehicle has left the first level and has entered the ground level. As space is thus made available within a parking area, the computer 10 will adjust the status signals accordingly.

It is anticipated that in the operation of the system of the invention for controlling receipts, that an operator will occasionally lose his prepunched ticket. The system of the invention is designed to handle such an eventuality. First a listing is made of all license plate numbers parked in the facility overnight. This may be done by a parking facility employee writing down the license numbers or dictating them. These license plate numbers are then keypunched and entered into the system 10. System 10 updates a data storage record containing the noted license plate numbers and the date each first appeared in the inventory of cars parked overnight. When a vehicle operator claims that he has lost his ticket, the exit station attendant phones the system console operator who enters the lane number and plate number through keyboard console 23 into the process controller 11. Process controller 11 obtains from data storage 17, 18 the record corresponding to the license plate and gives the date when the vehicle first parked overnight. The amount due is computed within the process controller 11 and displayed at the fee indicator for the appropriate lane. Thereafter, the normal cashier procedure is followed, and the parking fee is collected from the vehicle operator.

The system of the invention may be used with parking validation cards. That is, merchants within the service area of the parking facility may validate, for example, a data processing card by punching the merchant's identification number into said card in machine readable form. A plurality of fields may be provided in the validation card to permit validation by more than one merchant. If a customer asks a merhcant for parking validation, the merchant would punch his identification number in the next validation position. If the parker does not have a validation ticket, the merchant would have a supply of validation cards from which he would select one, stamp the date thereon, and punch his identification number in the first validation position. Upon leaving the parking facility, the operator of the vehicle gives the validation card to the attendant along with his prepunched ticket. The attendant inserts the validation card into validation card reader 83, which transmits the identification number to the process controller 11 for entry into the applicable data storage area for later billing to the merchant.

In the operation of the system of the invention, there may occur situations where the parking fee will be paid by the vehicle operator in part by validation ticket and in part by credit card or cash. Assuming, for example, that the parking fee is to be paid by validation ticket, with the excess of the fee over the amount validated to be charged by credit card. The operator of the vehicle first gives his parking ticket to the attendant, who inserts said ticket into ticket reader 82. Computer 10 then computes the parking fee to be collected as described previously. Next, the validation card is inserted into validation card reader 83. The validation identification numbers are transmitted to computer 10 which first checks said numbers for valid merchant identification numbers. Invalid validations are discounted from the total time validated. If the remaining validated time is more than the total time the car or vehicle was parked in the facility, then no additional fee is charged the operator, and the total parking fee is prorated over the valid validations and added into the data storage areas for the validating merchants for later billing of the merchants. If the amount of time validated is less than the time the vehicle was parked in the facility, the excess fee is computed. The attendant inserts the credit card into credit card reader 84, the customer identificaiton number is transmitted to system 10 and the balance due to the parking fee is added to the customer's record for subsequent billing.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A control apparatus for a parking facility, comprising
    sensing means for detecting the entry of a vehicle into said facility,
    ticket dispensing means actuated by said sensing means for dispensing a prepunched ticket to the operator of said vehicle and reading the prepunched identification number in said ticket,
    computer means responsive to said sensing means and dispensing means for storing the identification number on said ticket together with the date and time of entry of said vehicle into said facility,
    ticket reading means located at an exit station for reading and transmitting the prepunched identification number to said computer means,
    said computer means calculating the time spent by said vehicle in said facility and determining the parking fee, and
    indicator means controlled by said computer means for displaying the parking fee.

2. A control apparatus for a parking facility, comprising
    first sensing means for detecting the entry of a vehicle into said facility,
    ticket dispensing means actuated by said first sensing means for dispensing a prepunched ticket to the operator of said vehicle,
    first ticket reading means for reading the prepunched identification number in said ticket,
    computer means responsive to said first sensing means and said first ticket reading means for storing the identification number on said ticket together with the date and time of entry of said vehicle into said facility,
    a plurality of directional sensing means for detecting the passage of vehicles into and out of parking levels within said facility, and for signaling the same to said computer means,
    a plurality of display means controlled by said computer for displaying the status of the parking levels and directing vehicles to available parking areas,
    second ticket reading means located at the facility exit for reading and transmitting to said computer the prepunched ticket identification number,
    said computing means calculating the time elapsed between the readings of said ticket by said first ticket reading means and said second ticket reading means and determining the parking fee, and
    indicator means for displaying the parking fee.

3. A method for determining and displaying the fee to be collected from the operator of a vehicle upon exit from a parking facility, comprising the steps of
    sensing the entry of a vehicle into the entry station of the parking facility,
    dispensing a prepunched ticket to the operator of said vehicle,
    storing in a computer the identification number of said prepunched ticket and the date and time of dispensing said ticket,
    reading at an exit station the identification number in said prepunched ticket,
    calculating in said computer the time elapsed between the time said ticket was dispensed at the entry station and the time said ticket was read at the exit station,
    displaying the parking fee corresponding to said elapsed time.

4. A parking facility control system, comprising
    an entry station comprising
        a first treadle for sensing the entry of an auto into said entry station;
        a ticket spitter responsive to said first treadle for presenting a prepunched ticket to said auto and for reading the identification number on said ticket for input to a data processing system;
    an exit station comprising
        a card reader for reading the identification number on said ticket for input to said data processing system;
        an output display for displaying the parking fee;
    said data processing system comprising
        a data storage for storing the identification number on said ticket and the date and the time when said ticket was read by said ticket spitter;
        a calculator for calculating the time elapsed between the time at which said ticket was read by said ticket spitter and the time at which said ticket was read by said card reader, and for calculating the parking fee.

5. A parking facility control system comprising
    a data processing system,
    a facility status display controlled by said data processing system for signaling when parking within the facility is available to the public;
    a plurality of entry stations, each said entry station comprising
        an entry status display for indicating when the entry station is open,
        a first treadle for sensing the entry of a vehicle into said entry station,
        a ticket spitter responsive to said first treadle for presenting a prepunched ticket to said vehicle and for reading the identification number on said ticket for input to said data processing system,
        a master level status display controlled by said data processing system for indicating which parking levels have available parking spaces;
    a plurality of parking levels, each said level comprising
        a directional detector for signalling to the data processor when a vehicle enters or leaves said level,
        a level status display controlled by said data processor for directing said autos to available levels;
    a plurality of exit stations, each said exit station comprising
        an attendant badge reader for identifying to the data processor the parking attendant at the exit station,
        an exit lane signal controlled by said attendant badge reader,
        a second treadle for sensing the entry of an auto into said exit station,
        a terminal for reading the identification number on said ticket for input to said data processing system, an output display controlled by said data processor for displaying the parking fee to the attendant and the operator of the vehicle, a customer credit card reader for identifying the customer to the dating data processing system and for a charge account payment of the parking fee, a validation card reader for identifying validating merchants to be billed the parking fee, said data processing system comprising a data storage for storing the identification number on said ticket and the date and time at which said ticket was read by said ticket spitter;

a controller for calculating time elapsed between the time at which said ticket was read by said terminal, and by said ticket spitter for calculating the parking fee; and for calculating the number of autos in each level, and for controlling the facility status display, the master level status display, and the level status display.

References Cited

UNITED STATES PATENTS 3,317,892   5/1967   Schwarz _____ 340—31
3,484,586   12/1969   Wilson et al. _____ 235—61.6

DARYL W. COOK, Primary Examiner

U.S. Cl. X.R.

340—55

Disclaimer 3,541,308.—*George S. Ruby*, Scarsdale, N.Y. AUTOMATED PARKING FACILITY. Patent dated Nov. 17, 1970. Disclaimer filed June 10, 1977, by the assignee, *International Business Machines Corporation*.

Hereby enters this disclaimer to claims 1, 3 and 4 of said patent.

[*Official Gazette August 2, 1977.*]